Dec. 30, 1930.     N. W. BANCROFT     1,786,885
COCK OR FAUCET FOR FLUIDS
Filed July 31, 1929
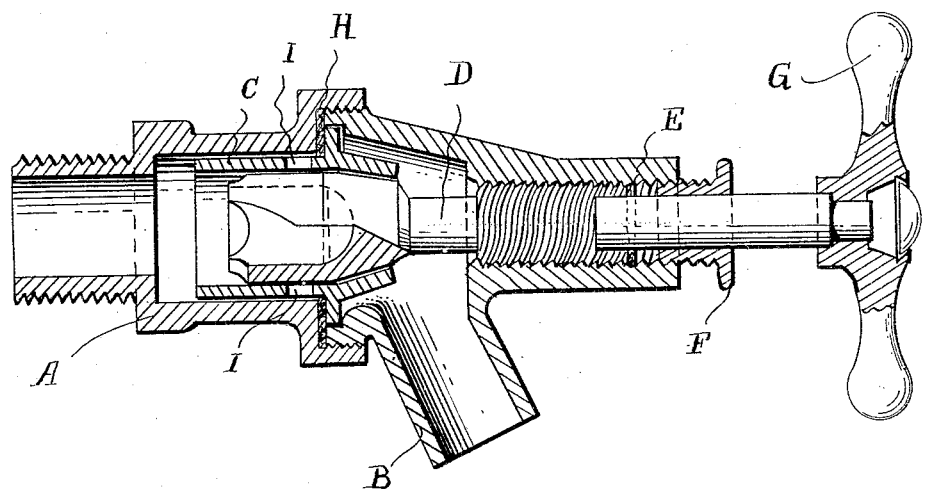
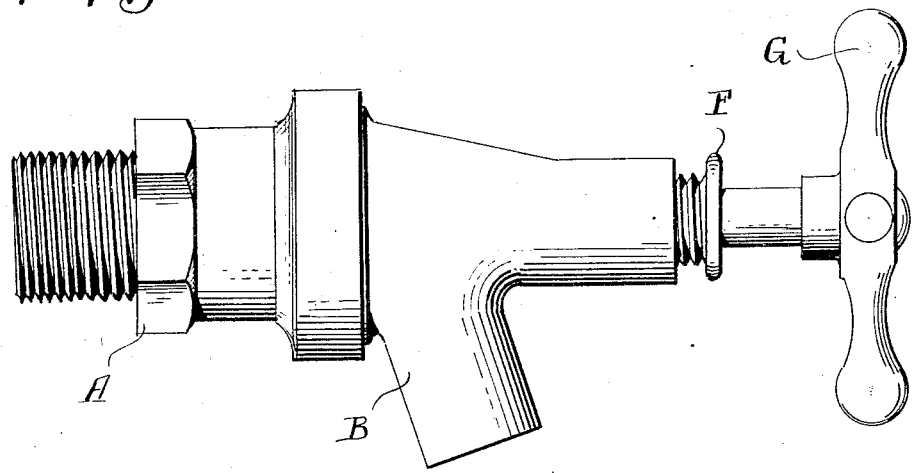
INVENTOR.
N. W. Bancroft
BY
ATTORNEYS.

Patented Dec. 30, 1930

1,786,885

UNITED STATES PATENT OFFICE

NATHANIEL WASHINGTON BANCROFT, OF BUENOS AIRES, ARGENTINA

COCK OR FAUCET FOR FLUIDS

Application filed July 31, 1929, Serial No. 382,425, and in Argentina July 4, 1929.

This invention refers to a new type of cock or faucet for fluids, especially for the service of running water or of other fluids under pressure. The advantages which it represents over other types of cocks or faucets are the following:

(a) *Simplicity.*—This cock or faucet contains no spring, washers or other parts which wear out quickly, being composed of only two conical bodies; one movable and the other fixed.

(b) *Economy.*—Since the cock or faucet of this invention cuts the water supply positively and without any subsequent loss, this valuable element of universal consumption is economized, completely eliminating all losses or leaks. There being no complicated or easily wearing out parts, the cost of up-keep and of spare parts is practically negligible.

(c) *Adaptability.*—Apart from domestic uses, this cock or faucet is especially appropriate for all kinds of use, such as for railways, water-works, freezing establishments, and the like. Without changing in any way the principle of the invention, it may be adapted to all kinds of use, by merely changing the outer form of its component parts.

(d) *Elimination of "water-hammer" effects.*—On closing the cock under the liquid pressure from the supply-pipe, the water-hammer effect is eliminated in this cock, always provided that a certain constant pressure is maintained, and not the varied pressure frequently found in some water supply tubing.

*Description and operation.*—I will describe my invention with reference to the accompanying drawings, in which Fig. I is a general outside view in side elevation of a cock embodying my invention; and—

Fig. II is a longitudinal section of the same.

In the said figures, the letter B represents the chamber through which the water is delivered by means of the spout, not shown in the drawing as it may be of varied form without affecting the principle of the invention.

The chamber B is attached to the cylindrical body A by the screw-thread H the two parts thus forming the outside part of the cock or faucet.

Secured by means of a threaded flange between the chamber B and the body A, is the cylindro-conical part C provided with a number (say 12) of ports I. This part together with the body A form the annular space in which the water is confined under the service pressure.

Inside of the part C, the cylindro-conical head of the plunger D, operated by means of a left hand screw and the handle G, is the movable part, which forms the opening and closing part of the cock valve. As will be seen, it is opened by moving it inwardly, and closed by partially withdrawing it, by means of the contact, or lack of contact between its external conical form and the interior form of the element C.

It is for this reason that the screw thread of the plunger D is left hand, since the natural movement for closing a screw-tap or cock is clock-wise and for opening counter-clock-wise. The two elements C and D are in close contact when the valve is closed, thus eliminating all possibility of leakage of the fluid between them. The fluid pressure itself aids the closure.

As above stated the plunger D by means of its left hand screw thread responds to the movement of the handle G to open or close the cock.

By moving the handle G "counter clockwise" the plunger D is moved inwardly and produces the separation of the movable and the fixed cone, and the conical head of the plunger D thus uncovers the ports I in the fixed cone C so that the fluid under pressure flows inwardly through them and around the sides of the plunger head, escaping through the spout attached to the open end of the element B.

The screw, which is preferably double threaded and left hand, of the plunger stem or rod (D) produces a gradual closure of the valve or cock, thus preventing the "water-hammer" effect which produces a racking of the piping and connections, as is well known.

The parts indicated by the letters E and F are suitable packing to prevent the escape of the fluid around the plunger stem.

It is understood that the form of description described and illustrated may be varied within certain limits. For example, the plunger stem may be smooth instead of threaded, thus making a cock which will remain open under manual pressure, and close automatically under the fluid pressure. The screw thread also of the said plunger stem need not necessarily be left hand. Other variations will occur to those skilled in the art, which will not depart from the spirit of the invention as set forth in the appended claims.

Having thus described my invention, what I claim is:

1. A cock or faucet for fluids comprising a chamber for the entrance of the fluid of a substantially cylindrical form and having on its inside a hollow cylindro-conical fixed body arranged with its open larger end toward the entrance of fluid and its open smaller end towards the escape of same; a movable body slidably arranged inside of the said fixed body and having a portion of its outer surface formed so as to close hermetically the smaller open end of the said fixed body when moved outwardly in the direction of the fluid pressure; a portion of the outer surface of the said movable body fitting the cylindrical wall of the said fixed body, a flange for hermetically attaching said fixed body to the said entrance chamber, said flange being placed substantially at the point of separation between the cylindrical and the conical part of the said fixed body an anular space between the rear part of the said fixed body and the inner wall of the said entrance chamber, for the admission of water or fluid under pressure, the walls of the said fixed body having openings so arranged as to be hermetically closed by the cylindrical part of the said movable body, and opened only when said movable body is moved inwardly against the fluid pressure until its conical part corresponds with the said openings thus leaving them open and admitting the fluid from the said annular space, through the said openings; and the said movable body forming the head of a plunger the stem of which extends outwardly through a suitable packed passage in the chamber.

2. A cock or faucet as claimed in claim 1, further characterized in that the plunger stem is provided with a screw thread for effecting the reciprocating motion of the plunger.

3. A cock or faucet as claimed in claim 1, further characterized in that the plunger stem is provided with a left hand screw thread for effecting the outward movement of the plunger for closing and vice-versa, thus not departing from the universally habitual direction of manual movement for such purposes.

Signed at Buenos Aires, aforesaid, this 5th day of July A. D. 1929.

NATHANIEL WASHINGTON BANCROFT.